US008912963B2

(12) United States Patent
Mow et al.

(10) Patent No.: US 8,912,963 B2
(45) Date of Patent: Dec. 16, 2014

(54) SYSTEM FOR TESTING MULTI-ANTENNA DEVICES USING BIDIRECTIONAL FADED CHANNELS

(75) Inventors: Matt A. Mow, Los Altos, CA (US); Robert W. Schlub, Cupertino, CA (US); Rocco V. Dragone, Jr., Mountain View, CA (US); Ruben Caballero, San Jose, CA (US)

(73) Assignee: Apple Inc., Cupertino, CA (US)

( * ) Notice: Subject to any disclaimer, the term of this patent is extended or adjusted under 35 U.S.C. 154(b) by 921 days.

(21) Appl. No.: 12/946,772

(22) Filed: Nov. 15, 2010

(65) Prior Publication Data

US 2012/0098713 A1 Apr. 26, 2012

Related U.S. Application Data (60) Provisional application No. 61/405,105, filed on Oct. 20, 2010.

(51) Int. Cl.
*G01R 29/10* (2006.01)
*H04B 17/00* (2006.01)

(52) U.S. Cl.
CPC ........ *H04B 17/0087* (2013.01); *H04B 17/0012* (2013.01); *H04B 17/0092* (2013.01)
USPC ...................... 343/703; 455/67.11; 455/67.12

(58) Field of Classification Search
USPC ................. 343/703; 455/67.11, 67.12, 67.13, 455/67.14, 67.16
See application file for complete search history.

(56) References Cited

U.S. PATENT DOCUMENTS

| 7,035,594 | B2* | 4/2006 | Wallace et al. ............ 455/67.12 |
| 7,937,107 | B2* | 5/2011 | Rofougaran et al. ...... 455/552.1 |
| 7,965,986 | B2* | 6/2011 | Foegelle .................... 455/67.11 |
| 8,346,091 | B2* | 1/2013 | Kummetz et al. ............. 398/115 |
| 2007/0243826 | A1 | 10/2007 | Liu |
| 2008/0056340 | A1 | 3/2008 | Foegelle |
| 2010/0013722 | A1 | 1/2010 | Disbrow, Jr. et al. |
| 2010/0099361 | A1 | 4/2010 | Lundstrom et al. |

(Continued)

FOREIGN PATENT DOCUMENTS

| WO | 0239545 | 5/2002 |
| WO | 2010094000 | 8/2010 |

OTHER PUBLICATIONS

Mow et al., U.S. Appl. No. 13/052,381, filed Mar. 21, 2011.

(Continued)

*Primary Examiner* — Hoang V Nguyen
(74) *Attorney, Agent, or Firm* — Treyz Law Group; Jason Tsai (57) ABSTRACT

A test system for testing multiple-input and multiple-output (MIMO) systems is provided. The test system may convey radio-frequency (RF) signals bidirectionally between a base station emulator and a device under test (DUT). The DUT may be placed within a test chamber during testing. An antenna mounting structure may surround the DUT. Multiple antennas may be mounted on the antenna mounting structure to transmit and receive RF signals to and from the DUT. A first group of antennas may be coupled to the base station emulator through downlink circuitry. A second group of antennas may be coupled to the base station emulator through uplink circuitry. The uplink and downlink circuitry may each include a splitter, channel emulators, and amplifier circuits. The channel emulators and amplifier circuits may be configured to provide desired path loss and channel characteristics to model real-world wireless network transmission.

22 Claims, 6 Drawing Sheets

(56) References Cited

U.S. PATENT DOCUMENTS

| | | |
|---|---|---|
| 2010/0171650 A1* | 7/2010 | Okano et al. .................. 342/173 |
| 2010/0227607 A1 | 9/2010 | Lorion et al. |
| 2010/0233969 A1 | 9/2010 | Frolik et al. |
| 2010/0285753 A1 | 11/2010 | Foegelle |
| 2011/0299570 A1 | 12/2011 | Reed |
| 2012/0071107 A1 | 3/2012 | Falck et al. |
| 2013/0059545 A1 | 3/2013 | Kyosti et al. |

OTHER PUBLICATIONS

Jukka-Pekka Nuutinen et al., On the MIMO OTA test system, CHINACOM lo Aug. 25-27, 2010, pp. 1-5.

Jukka-Pekka Nuutinen et al., On the MIMO OTA test system, CHINACOM 2010, Aug. 25-27, 2010, pp. 1-5, Beijing, China, available at http://ieeeexplore.ieee.org/stamp/stamp.jsp? tp=&arnumber=5684801&isnumber=5684623.†

\* cited by examiner
† cited by third party

SYSTEM FOR TESTING MULTI-ANTENNA DEVICES USING BIDIRECTIONAL FADED CHANNELS

This application claims the benefit of provisional patent application No. 61/405,105, filed Oct. 20, 2010, which is hereby incorporated by reference herein in its entirety.

BACKGROUND

This relates to testing devices with antennas, and more particularly, to testing multi-antenna devices.

Electronic devices such as handheld electronic devices, portable electronic devices, and computers often have wireless communication capabilities. Electronic devices with wireless communication capabilities typically include antennas. Antennas transmit and receive radio frequency (RF) signals.

It may be desirable to incorporate more than one antenna in a single electronic device. Electronic devices with more than one antenna may sometimes be referred to as multi-antenna devices. Multi-antenna devices may exhibit improved performance over single-antenna devices. The performance improvement provided by multi-antenna devices may depend on factors such as multipath propagation, spatial correlation of the wireless signals, delay/frequency spread of the wireless signals, etc. It may be desirable to optimize multi-antenna devices while taking into account the various factors that affect device performance.

In order to optimize the design of multi-antenna devices, it may be useful to test a wireless communications system in which data is sent back and forth between a first device and a second device. The first and second devices may each have more than one antenna. Wireless signals that travel back and forth between the first and second devices may travel through a channel whose properties are affected by the presence of obstacles, reflective materials, and other environmental factors.

For example, imagine a scenario in which a cellular telephone is communicating wirelessly with a base station. The wireless communications channel in this type of scenario will be influenced by physical variations in terrain between the cellular telephone and the cell tower such as the presence of buildings, moving cars, mountains, regions of water, etc.

Efforts have been made to simulate communications systems using software. In software simulations, the behavior of communications devices and the wireless channel are handled using software abstractions. Software simulations are not necessarily accurate models of the actual characteristics of a channel and the interactions between the communicating devices and the channel.

To address the shortcomings of software simulations, efforts have also been made to simulate a communications system using channel emulator hardware. In a typical test arrangement, a first device may have a first RF front end disconnected from the antenna of the first device. The first RF front end may be connected to an input of a channel emulator. A second device may have a second RF front end that is disconnected from the antenna of the second device. The second RF front end may be connected to an output of the channel emulator. The channel emulator attempts to recreate the characteristics of a real-life channel (e.g., multipath gain, multipath delay, etc.). Because the channel emulator makes simplifying assumptions about the behavior of a typical channel, the channel emulator will not be able to effectively model how the antennas behave within the device housing, how polarization and gain effects impact antenna performance, or how devices with multiple antennas operate.

Moreover, conventional test arrangements that are used for testing MIMO systems do not accurately emulate uplink channel fading and uplink path loss. The conventional test systems use uplink path loss values that are different than the path loss values experienced by radio-frequency signals in realistic wireless networks. The uplink signal path of conventional test systems typically remains unperturbed by any form of fading and sees low levels of attenuation. Testing multi-antenna devices in this way may not be capable of accurately characterizing uplink performance.

It would therefore be desirable to be able to provide improved ways to test wireless communications performance for devices with antennas.

SUMMARY

A test system is provided for wireless testing of electronic devices. The electronic devices may have multiple antennas. A multi-antenna device that is being tested may be referred to as a device under test (DUT).

The DUT may be placed within a test chamber during wireless testing. The walls of the test chamber may be lined with radio-frequency (RF) absorbent material (e.g., a rubberized pyramid-shaped foam) that minimizes reflections of wireless signals.

An antenna mounting structure may surround the DUT in the test chamber. Test antennas (sometimes referred to as over-the-air antennas) may be mounted on the antenna mounting structure in a desired array pattern. The array pattern may, for example, be a substantially two-dimensional pattern (e.g., a ring-shaped arrangement) that surrounds the DUT in two dimensions or a three-dimensional pattern (e.g., a spherical arrangement) that surrounds the DUT in three dimensions.

The test antennas may include a first group of antennas that are used for downlink transmission (e.g., antennas that transmit RF signals to the DUT). The first group of antennas may generate a desired feasibility region in which the DUT is tested. The feasibility region represents the portion of the testing chamber that has a desired radiation pattern. The first group of antennas (e.g., downlink test antennas) may be coupled to a base station emulator through downlink circuitry. The downlink circuitry may include a first radio-frequency splitter, first channel emulators, and first amplifier circuits.

The test antennas may include second group of antennas that are used for uplink testing (e.g., antennas that receive RF signals from the DUT). These test antennas may be placed in desired locations on the antenna mounting structure to provide the desired spatial fading. The second group of antennas (e.g., uplink test antennas) may be coupled to the base station emulator through uplink circuitry. Uplink circuitry may include a second radio-frequency splitter, second channel emulators, and second amplifier circuits.

A test system of this type may support bidirectional multiple-input and multiple-output (MIMO) wireless testing. The test system can be used to accurately test wireless performance in the presence of effects such as multipath propagation, interference, handover mechanisms, power control, delay and frequency spread of wireless signals, etc. The test system may accurately emulate uplink and downlink path loss (e.g., by using amplifiers and attenuators to provide predetermined downlink and uplink path loss) and channel characteristics to model real-world wireless transmission between base stations and wireless electronic devices (e.g., the test system may accurately emulate fading downlink channels and fading uplink channels).

The test system may be used to test a variety of operating scenarios. The test system may, for example, be used in testing various types of cellular networks, wireless local area networks (WLAN), communications systems that use various modulation and multiplexing techniques (e.g., frequency modulation, time-division-multiplexing, etc.), other system configurations (e.g., multiple-input-multiple-output (MIMO) configurations, single-input-multiple-output (SIMO) configurations, multiple-input and single-output (MISO) configurations, and single-input-single-output (SISO) configurations, etc.). Tests may also be performed on configurations that include multiple access points, multiple DUTs, etc.

Further features of the present invention, its nature and various advantages will be more apparent from the accompanying drawings and the following detailed description.

DETAILED DESCRIPTION

This relates to test systems for wireless testing of electronic equipment. The test systems may, for example, be used to test electronic devices with multiple antennas. Electronic devices such as handheld electronic devices, portable electronic devices, computers, and other multimedia electronic devices may include antennas such as patch antennas, planar inverted-F antennas, slot antennas, etc. To enhance wireless performance, it may be desirable for a device to use multiple antennas. By using multiple antennas simultaneously, capacity can be enhanced.

Such multiple-antenna equipment can, however, pose testing challenges. Multiple antenna systems typically operate by exploiting the multiple paths between transmitters and receivers. These multiple paths may, for example, involve radio-frequency signals that are received at a device from widely divergent angles. Some paths may, for example, involve almost direct, line-of-sight communications between transmitter and receiver. Other paths may involve reflections off of intervening objects and may arrive at a receiver from a much different angle. To properly test a device that has multiple antennas, it may therefore be desirable to use the test system to replicate complex three-dimensional operating environments. For example, it may be desirable to use the test system to create radio-frequency signal beams that can be directed at a device under test from a desired arbitrary angle or combination of angles in three-dimensional space.

Antennas are components that are designed to transmit or receive electromagnetic waves such as radio frequency (RF) waves. Electronic devices with antennas may transmit or receive RF signals wirelessly.

A single electronic device such as a portable handheld electronic device may have more than one antenna. A multi-antenna device may exhibit performance improvements over a single-antenna device. For example, in comparison to a single-antenna device, a multi-antenna device may have a higher antenna gain and/or increased capacity. It may therefore be desirable to use multi-antenna devices in a communications system. A communications system in which multiple antennas are used at both the transmitting device and the receiving device may sometimes be referred to as a multiple-input and multiple-output (MIMO) system or a multiple antenna system (MAS).

It may be desirable to optimize a multi-antenna device for use in a MIMO system. Consider a first (simplified) scenario in which a first single-antenna device is communicating wirelessly with a second single-antenna device. The first single-antenna device may be a user's cellular telephone. The second single-antenna device may be a cellular telephone base station. The first single-antenna device may attempt to transmit a packet of data to the second single-antenna device. The transmitted data may be in the form of wireless signals (e.g., RF signals). The wireless signals may travel through air. The wireless signals may also make contact with intervening objects that exist between the first and second single-antenna devices. The wireless signals may therefore be deflected or reflected off the surfaces of the intervening objects. The intervening objects may include buildings, moving cars, bodies of water, mountains, the ionosphere, animals, or any other entity that may exist between the first and second single-antenna devices.

In a typical scenario, the wireless signals that are transmitted by the cellular telephone will not all take the same path to the cellular base station. For example, the wireless signals may each be deflected or reflected off the surfaces of different intervening objects at different angles. Different portions of the wireless signals may therefore reach the receiving antenna through different paths. The phenomenon in which radio signals arrive at a receiving antenna over two or more distinct paths is sometimes referred to as multipath propagation.

The collective medium through which the wireless signals may travel between the two wireless devices may be referred to as the channel of the wireless communications system. Accurate modeling of a wireless communications channel in an environment where multipath propagation is present can be fairly complex, because the channel is a time-dependent entity (e.g., the characteristic of the channel may constantly be evolving in time) and should take into account all possible intervening objects and different possible paths that may be taken by the wireless signals. Despite these difficulties, software simulations and channel emulation hardware can often be used to satisfactorily test single-antenna equipment if appropriate simplifying assumptions are made.

Wireless tests on multi-antenna equipment cannot, however, always be tested using conventional test systems. Consider, as an example, a second scenario in which a first multi-antenna device is communicating with a second multi-antenna device (i.e., MIMO system). The wireless signals transmitted in the second scenario may likewise be sent through a channel. This second scenario will generally be much more complex than the first scenario because the behavior of each of the multiple antennas may interact and interfere with one another. Wireless tests performed on the first and second antennas in isolation cannot simply be superimposed to determine the wireless performance of the antennas when operating together. This is because the behavior of one antenna on a receiving device will typically affect the behavior of another antenna on the receiving device. It is therefore difficult or impossible to realistically simulate a MIMO scenario exclusively in software.

It may therefore be desirable to test the MIMO configuration using an approach that utilizes actual hardware. Conventional hardware testing involves connecting a base station to a test device through a channel emulator. The channel emulator is a type of "black box" that can emulate the behavior of a real-life channel. The base station and the test device may each have an RF front end and an antenna. The RF front end of the base station is directly routed to the channel emulator. The RF front end of the test device is directly connected to the channel emulator. The antennas of the base station and/or the test device are effectively decoupled from the test system, because the antennas are not connected to the RF front ends and are not involved in transmission or retrieval of the wireless signals. Testing a wireless communications system in this way may not fully take into account the interaction of the antennas with the channel, the interaction of the antennas with other components in the wireless device, the interference and noise associated with the multiple antennas, etc.

A controlled test environment that can accurately emulate actual wireless communication (e.g., in a MIMO system) and that can take into account the behavior of the multiple antennas may be used to enhance test performance. A device under test (DUT) may be placed in the controlled test environment. The DUT may be a multi-antenna device. The antenna design of the DUT may be varied to explore the impact of design variations. For example, the number of antennas, the distance between antennas, the orientation of the antennas, and the polarization of the antennas may be adjusted. Tests can be performed for each test configuration. Each of the multiple antennas in the tested equipment may be active, allowing protocol-compliant tests to be performed. Using this approach, an antenna designer can investigate the effects/tradeoffs of such adjustments to produce an optimized antenna design for a wireless communications system.

Figure 1:
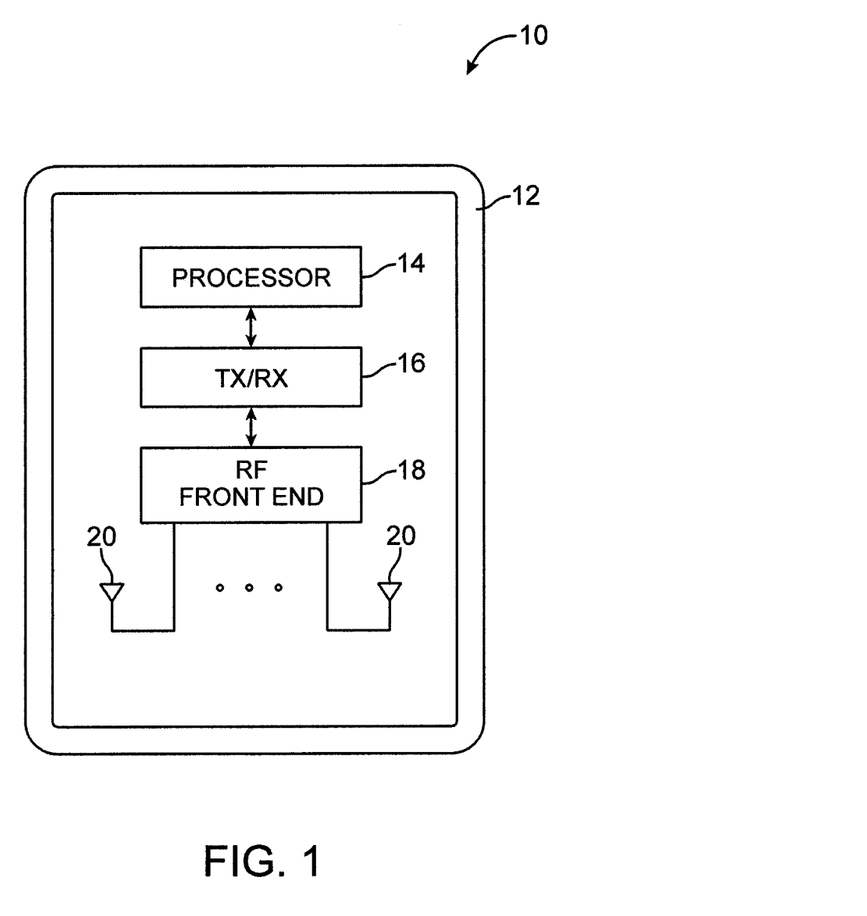
FIG. 1 is a diagram showing an illustrative multi-antenna device that may be used as a device under test when performing wireless testing in a test system in accordance with an embodiment of the present invention.

FIG. 1 shows an example of a test device such as device under test (DUT) 10. DUT 10 may be a handheld electronic device, a portable electronic device, a computer, a multimedia device, or any other electronic equipment. DUT 10 may have a device housing such as housing 12 that forms a case for its associating components.

DUT 10 may have a processor such as processor 14. Processor 14 may be used in controlling the operation of DUT 10. Processor 14 may include one or more processing circuits. Examples of circuits that may be used in implementing processor 14 include microprocessors, baseband processors, digital signal processors, microcontrollers, application-specific integrated circuits, etc.

Processor 14 may interact with a transceiver circuit such as transceiver block 16. Transceiver block 16 may include an analog-to-digital converter (ADC), a digital-to-analog converter (DAC), a digital down converter (DDC), and a digital up converter (DUC). In a scenario in which DUT 10 is transmitting, processor 14 may provide digital data (e.g., baseband signals) to the DUC. The DUC may convert or modulate the baseband digital signals to an intermediate frequency (IF). The IF digital signals may be fed to the DAC to convert the IF digital signals to IF analog signals. The IF analog signals may then be fed to an RF front end such as RF front end 18.

In another scenario in which DUT 10 is receiving wireless signals, RF front end 18 may provide incoming IF analog signals to the ADC. The ADC may convert the incoming IF analog signals to incoming IF digital signals. The incoming IF digital signals may then be fed to the DDC. The DDC may convert the incoming IF digital signals to incoming baseband digital signals. The incoming baseband digital signals may then be provided to processor 14 for further processing. Transceiver block 16 may either up-convert baseband signals to IF signals or down-convert IF signals to baseband signals. Transceiver block 16 may therefore sometimes be referred to as an IF stage.

RF front end 18 may include circuitry that couples transceiver block 16 to device antennas such as antennas 20. RF front end 18 may include circuitry such as matching circuits, band-pass filters, mixers, a low noise amplifier (LNA), a power amplifier (PA), etc. In the scenario in which DUT 10 is transmitting, RF front end 18 may up-convert the IF analog signals from transceiver block 16 to RF analog signals (e.g., the RF signals typically have higher frequencies than the IF signals). The RF analog signals may be fed to antennas 20 and may be broadcasted.

In the another scenario in which DUT 10 is receiving wireless signals, antennas 20 may receive incoming RF analog signals from a broadcasting device such as a base transceiver station, access point, etc. The incoming RF analog signals may be fed to RF front end 18. RF front end 18 may down-convert the incoming RF analog signals to IF analog signals. The IF analog signals may then be fed to transceiver block 16 for further data processing.

Processor 14, transceiver block 16, RF front end 18, and antennas 20 may be housed within housing 12. As shown in FIG. 1, there may be more than one antenna 20 within housing 12. The number, position, orientation, polarization, and gain of the antennas may be adjusted for optimal performance of DUT 10 in a MIMO test system.

DUT 10 may include satellite navigation system receiver circuitry such as Global Positioning System (GPS) receiver circuitry (e.g., circuitry for receiving satellite positioning signals at 1575 MHz). Transceiver circuitry 16 may handle 2.4 GHz and 5 GHz bands for WiFi® (IEEE 802.11) communications and may handle the 2.4 GHz Bluetooth® communications band. DUT 10 may use cellular telephone transceiver circuitry for handling wireless communications in cellular telephone bands such as bands at 850 MHz, 900 MHz, 1800 MHz, 1900 MHz, and 2100 MHz or other cellular telephone bands of interest. DUT 10 may include circuitry for other short-range and long-range wireless links if desired. For example, DUT 10 may include wireless circuitry for receiving radio and television signals, paging circuits, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

During wireless testing, DUT 10 may be configured to transmit multiple data streams. For example, the GPS receiver circuitry may transmit a first signal stream using a first set of antenna(s), whereas the cellular telephone transceiver circuitry may transmit a second signal stream using a second set of antenna(s). If desired, DUT 10 may be configured to generate any number of independent data streams using any number of antennas.

Figure 2:
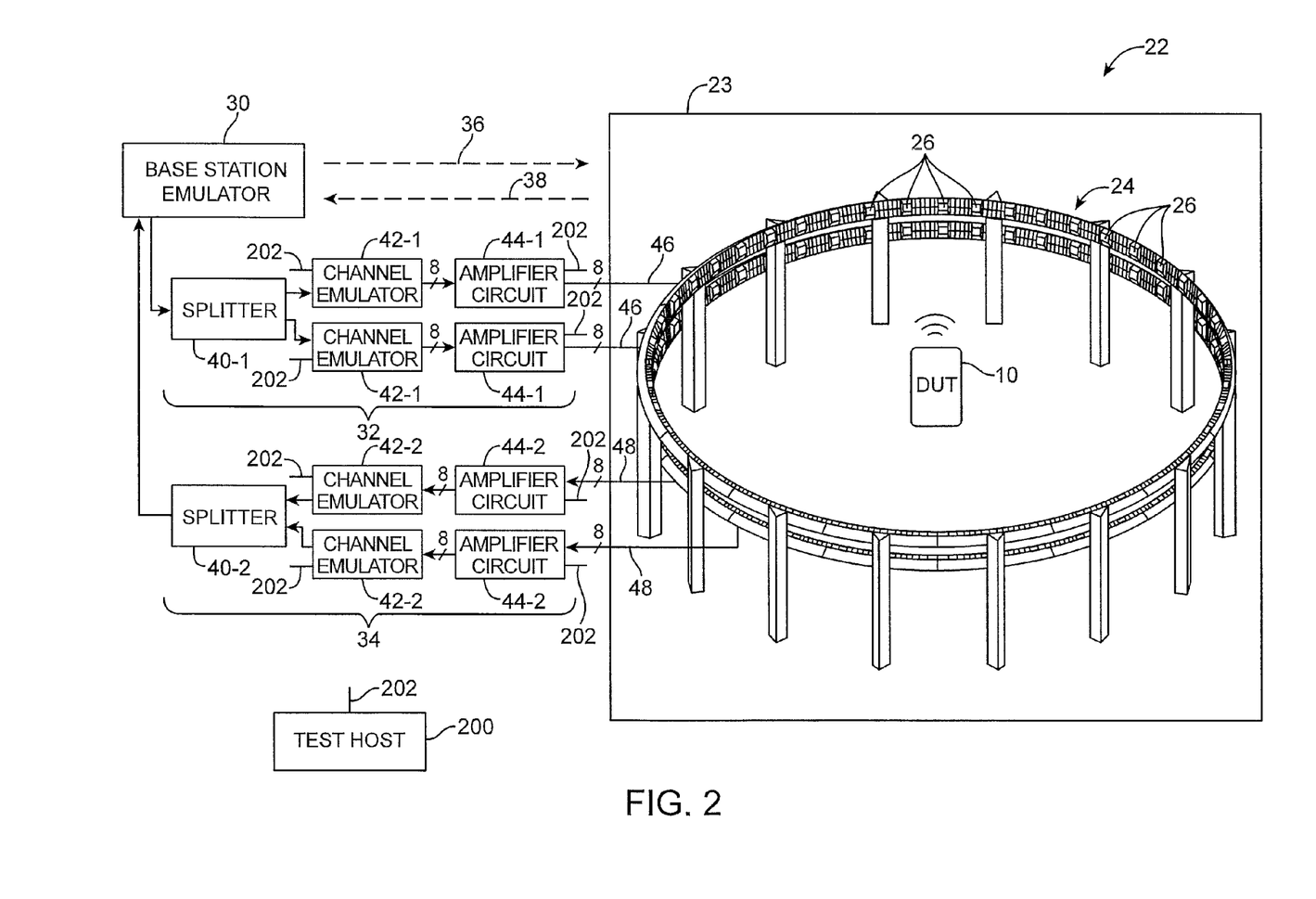
FIG. 2 is a diagram showing an illustrative system that can be used for bidirectional testing of wireless equipment such as multi-antenna devices in accordance with an embodiment of the present invention.

An illustrative test system that may include a two-dimensional array of test antennas is shown in FIG. 2. Test system 22 of FIG. 2 may be used to model wireless communication between DUT 10 and a base transceiver station in a MIMO system. Test system 22 may be configured to accurately model downlink and uplink radio-frequency signal paths in "live" wireless networks (e.g., test system 22 may be configured to provide predetermined downlink path loss and uplink path loss that track path loss experienced by radio-frequency signals in real-world environments). Test system 22 can also be used to model spatial fading (e.g., random deviations in signal power attenuation over a given propagation medium) associated with the downlink path and the uplink path.

Comprehensive testing may require the ability to operate all of the antennas in DUT 10 while using test system 22 to produce radio-frequency test signals with a wide range of possible orientation angles, beam divergences, etc. To ensure that these tests are exhaustive, it may be desirable to use a two-dimensional or three-dimensional array of antennas in a test chamber. A two-dimensional array of test antennas can be used in the test system to recreate test signals that approach the DUT from any desired angle in a horizontal test plane (i.e., at any angle from 0°-360°, whereas a three-dimensional antenna array can be used to sweep the test beam out of the horizontal plane.

As shown in FIG. 2, test system 22 may include an antenna mounting structure such as antenna mounting structure 24, a base station emulator such as base station emulator 30, circuitry 32 that is associated with downlink testing, circuitry 34 that is associated with uplink testing, and other control circuitry and test equipment. Antennas such as antennas 26 (sometimes referred to as over-the-air antennas) may be mounted on antenna mounting structure 24 in an arrangement as shown in FIG. 2.

Antenna mounting structure 24 may be placed in a test chamber such as test chamber 23. Test chamber 23 may have a cubic structure (six square walls) or a rectangular prism-like structure (six rectangular walls), if desired. Test chamber 23 may be internally lined by absorbent material. The absorbent material may be formed from pyramid-shaped foams or other suitably lossy material. Test chamber 23 may sometimes be referred to as an anechoic chamber. If desired, reverberation chambers (e.g., chambers with one or more tuners that can be moved to different orientations to obtain varying spatial distribution of electrical and magnetic field strength) may also be used.

If desired, DUT 10 may be directly coupled to circuitry 34 using directional couplers and RF-to-optical fiber transceivers to sample transmissions from DUT 10 with minimal impact to device radiated performance.

Downlink circuitry 32 may serve to convey radio-frequency (RF) signals from base station emulator 30 to antennas 26 in the direction indicated by arrow 36. Downlink circuitry 32 may include radio-frequency splitter 40-1, channel emulators 42-1, and amplifier circuits 44-1. During wireless testing, base station emulator 30 may convey radio-frequency signals to splitter 40-1. Splitter 40-1 may couple the radio-frequency signals onto multiple paths.

Channel emulators 42-1 may each receive radio-frequency signals over a respective path from splitter 40-1. First channel emulator 42-1 may serve to emulate downlink signal paths for vertically polarized RF signals, whereas second channel emulator 42-1 may serve to emulate downlink signal paths for horizontally polarized RF signals (as an example). Antennas 26 that are associated with downlink circuitry 32 (e.g., antennas 26 that are coupled to paths 46) may receive vertically polarized and horizontally polarized radio-frequency signals from channel emulators 42-1 through amplifier circuits 44-1.

Uplink circuitry 34 may serve to convey radio-frequency signals from antennas 26 to base station emulator 30 in the direction indicated by arrow 38. Uplink circuitry 34 may include radio-frequency splitter 40-2, channel emulators 42-2, and amplifier circuits 44-2. During wireless testing, antennas 26 that are associated with uplink circuitry 34 (e.g., antennas 26 that are coupled to paths 48) may convey radio-frequency signals received from DUT 10 to amplifier circuits 44-2. For example, a first group of uplink antennas 26 may be used to receive vertically polarized RF signals, where a second ground of uplink antennas 26 may be used to receive horizontally polarized RF signals. Amplifier circuits 44-2 may feed the vertically polarized and horizontally polarized radio-frequency signals to respective channel emulators 42-2. Splitter 40-2 may receive the radio-frequency signals from channel emulators 42-2. Splitter 40-2 may convey the radio-frequency signals to base station emulator 30.

Amplifier circuits 44-1 (e.g., low noise amplifiers, power amplifiers, power attenuators, etc.) may be configured to provide appropriate amplification/attenuation such that the downlink signals experience an appropriate amount of downlink path loss. Amplifier circuits 44-2 (which may include attenuator circuits) may be configured to provide appropriate amplification/attenuation such that uplink signals experience a desired amount of uplink path loss.

Accurately modeling downlink and uplink path loss using this approach enables accurate characterization of open-loop power control algorithms (e.g., algorithms that direct the DUT to transmit at a maximum output power level) and closed-loop power control algorithms (e.g., algorithms in which the base station emulator directs the DUT to adjust its output power level using transmit power control commands).

Amplifier circuits 44-1 and 44-2 may have control inputs that receive control signals from a test host such as test host 200 over control path 202. Test host 200 may, for example, be a host personal computer or other types of computing equipment. The control signals may be adjusted to the tune the gain/attenuation provided by each amplifier circuit. Adjustable amplifier circuits 44-1 and 44-2 may be configured to compensate for the wide dynamic range of signal power levels and pattern variations of DUT 10 (e.g., circuits 44-1 and 44-2 may be applied to uplink and downlink signal paths to equalize power levels transmitted and received at each antenna 26) and may therefore sometimes be referred to as automatic gain compensation (AGC) circuits.

Test host 200 may also control channel emulators 42-1 and 42-2 by sending command signals over path 202 (see, e.g., FIG. 2). For example, test host 200 may configure channel emulators 42-1 and 42-2 to perform channel emulation based on a selected channel model, to provide desired channel fading characteristics, etc.

Test system 22 may be characterized and calibrated for different scenarios. During downlink testing, a selected subgroup of antennas 26 may be used to transmit a desired pattern of radio-frequency signals to DUT 10 to model a first scenario (as an example). During uplink testing, DUT 10 may be directed to transmit RF signals in a desired direction to model a second scenario.

Test system 22 as shown in FIG. 2 is merely illustrative. Additional base station emulators may be used to add downlink signals via independently controlled spatial (downlink) fading channels and to model adjacent channel interference, handover scenarios, etc. Testing may be extended to real base stations, if desired. Testing performed using base station emulators 30 or real base stations may be used to test any wireless network technology (e.g., eNodeB, NobeB, access point, etc.).

Additional DUTs 10 may be placed within test structure 24 in a conducted or radiated arrangement to model uplink interference from same or adjacent channels. Each path (e.g., path 46 or path 48) may be coupled to less than eight antennas 26 or more than eight antennas 26, if desired.

Figure 3:
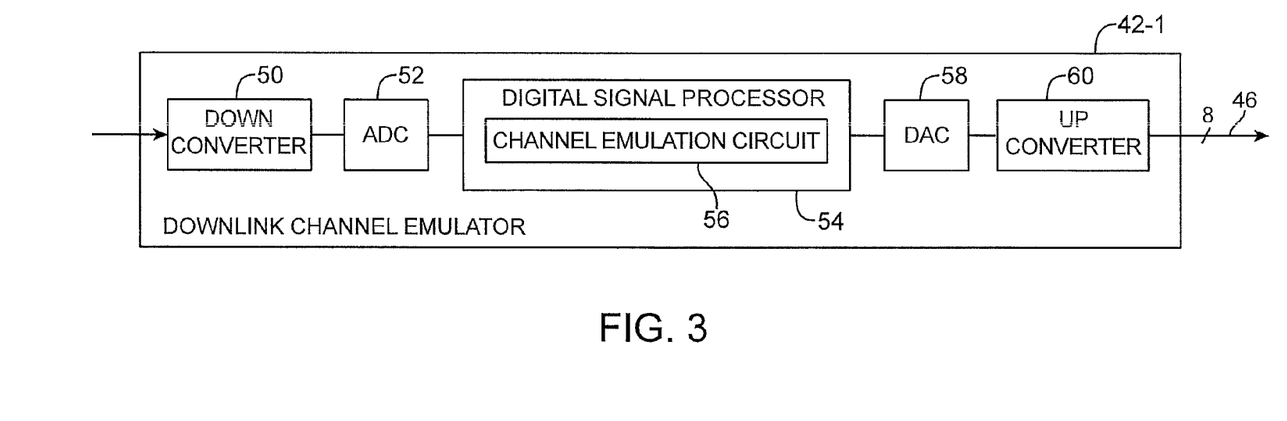
FIG. 3 is a diagram of an illustrative downlink channel emulator in accordance with an embodiment of the present invention.

FIG. 3 is a diagram of illustrative downlink channel emulator 42-1. As shown in FIG. 3, channel emulator 42-1 may include down converter 50, analog-to-digital converter (ADC) 52, digital signal processor (DSP) 54, digital-to-analog converter (DAC) 58, up converter 60, and other control circuitry. Digital signal processor 54 may include channel emulation circuit 56.

Figure 4:
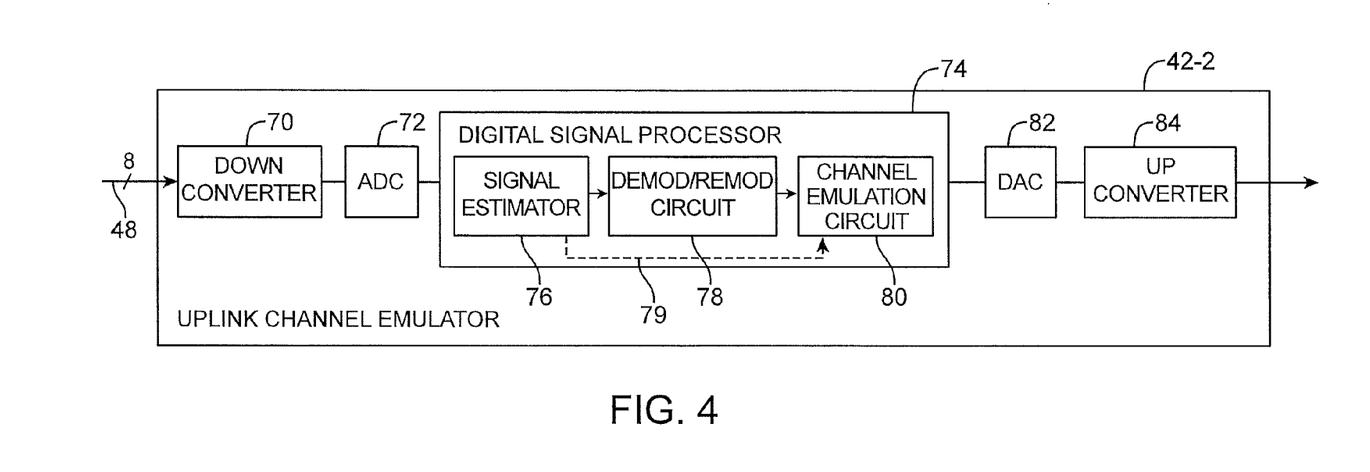
FIG. 4 is a diagram of an illustrative uplink channel emulator in accordance with an embodiment of the present invention.

FIG. 4 is a diagram of illustrative uplink channel emulator 42-2. As shown in FIG. 4, channel emulator 42-2 may include down converter 70, ADC 72, digital signal processor 74, DAC 82, up converter 84, and other control circuitry. Digital signal processor 74 may include signal estimator 76, demodulation/remodulation circuit 78, and channel emulation circuit 80.

Accurate uplink emulation may depend on accurately performing signal estimation. Antennas 26 coupled to uplink circuitry 34 may be positioned at desired locations on antenna mounting structure 24 to provided uplink spatial fading (e.g., test system 22 may provide fading uplink channel emulation). The RF signals received using these antennas 26 may be conveyed to channel emulator 42-2. Down converter 70 down converts the RF signals. ADC 72 may convert the RF signals from analog signals to digital signals.

Signal estimator 76 may perform signal estimation for each independent signal stream transmitted from DUT 10. Array processing techniques may be used to analyze the digital signals to extract (isolate) each independent stream via a cost function optimization process. For example, signal estimator 76 may be used to provide signal performance values such as signal-to-noise ratio (SNR), highest signal power, and other performance metrics for each independent stream.

One suitable cost function optimization uses a least mean square algorithmic approach. For example, signals for each independent stream may be estimated based on an array of received signals using the following expressions.

$$\min < \|W_1 S - S_1'\|^2 > \quad (1)$$

$$\min < \|W_2 S - S_2'\|^2 > \quad (2)$$

$$S_1 = W_1 S \quad (3)$$

$$S_2 = W_2 S \quad (4)$$

As shown in expression 1, a suitable weighting factor $W_1$ that minimizes the square of the magnitude of the difference between the product of $W_1$ and the array of received signals (S) and a model prediction array of a first independent stream ($S_1'$) may be determined. As shown in expression 2, a suitable weighting factor $W_2$ that minimizes the square of the magnitude of the difference between the product of $W_2$ and received signal array S and a model prediction array of a second independent stream ($S_2'$) may be determined. Estimation and extraction of each independent stream can then be determined by calculating the product of the respective weight factors and the received signal array. As shown in equations 3 and 4, first independent stream $S_1$ may be calculated by taking the product of $W_1$ and S, whereas second independent stream $S_2$ may be calculated by taking the product of $W_2$ and S.

In other suitable array processing algorithms such as pilot tone analysis, signal estimation of each independent data stream need not be performed.

If desired, circuit 78 may be used to demodulate and remodulate the digital signals. Demodulating and remodulating the digital signals in this way may serve to reduce undesired noise from the digital signals. Channel emulation circuit 80 may receive the "clean" version of the digital signals.

Channel emulation circuit 80 may be used to perform real-world channel emulation. Channel emulation circuit 80 may be loaded with a desired channel model (e.g., a geometric channel model, a stochastic channel model, etc.). Channel emulation circuit 80 may have a control input that receives the estimated values produced by signal estimator 76 over control line 79. The control signals on line 79 may serve to configure channel emulation circuit 80 to accurately model real-world channels. For example, channel emulation circuit 80 may be used to accurately model a MIMO system employing multiple simultaneous transmissions that use the wireless local area network protocol (e.g., IEEE 802.11n), the WiMAX communications protocol, 3GPP Long Term Evolution (LTE) standard, etc. Channel emulation circuit 80 may also be used to accurately model RF signal transmission in single-input-single-output (SISO) systems, if desired.

Figure 5:
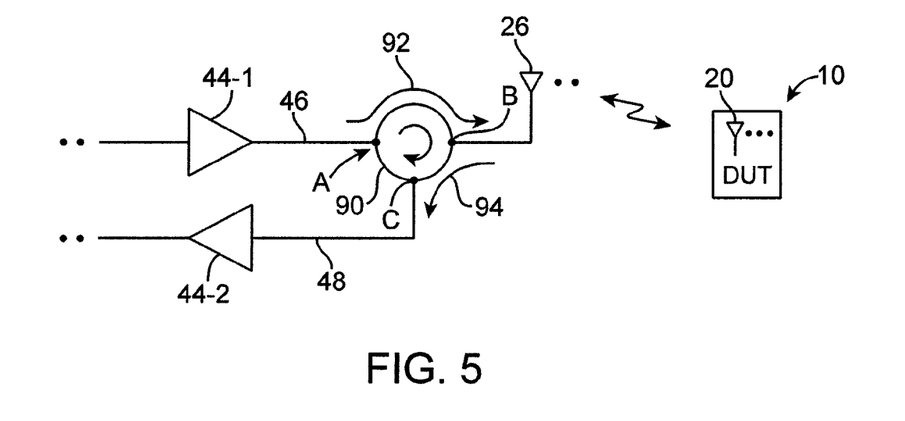
FIG. 5 is a diagram of illustrative test equipment with a directional coupler in accordance with an embodiment of the present invention.

As shown in FIG. 5, antennas 26 may be shared between downlink circuitry 32 and uplink circuitry 34 (e.g., each antenna 26 may be used to transmit and receive radio-frequency signals during wireless testing). For example, each antenna 26 may be coupled to amplifier circuits 44-1 and 44-2 through a directional coupler such as directional coupler 90. Directional coupler 90 may have three ports such as ports A, B, and C. Port A of coupler 90 may be connected to the output of amplifier 44-1. Port B of coupler 90 may be connected to the input of amplifier 44-2. Port C of coupler 90 may be connected to antenna 26.

During uplink signal transmission, directional coupler 90 may pass radio-frequency signals from port A to port B (as indicated by arrow 92). The RF signals may be transmitted wirelessly from test antenna 26 to antenna 20 of DUT 10. During downlink signal reception, directional coupler 90 may route radio-frequency signals from port B to port C (as indicated by arrow 94). The radio-frequency signals conveyed in the direction of arrow 94 represent RF signals wirelessly transmitted from antenna 20 of DUT 10 to test antenna 26. Ports A and C may be isolated by coupler 90 (e.g., no signals can pass between ports A and C).

Figure 6:
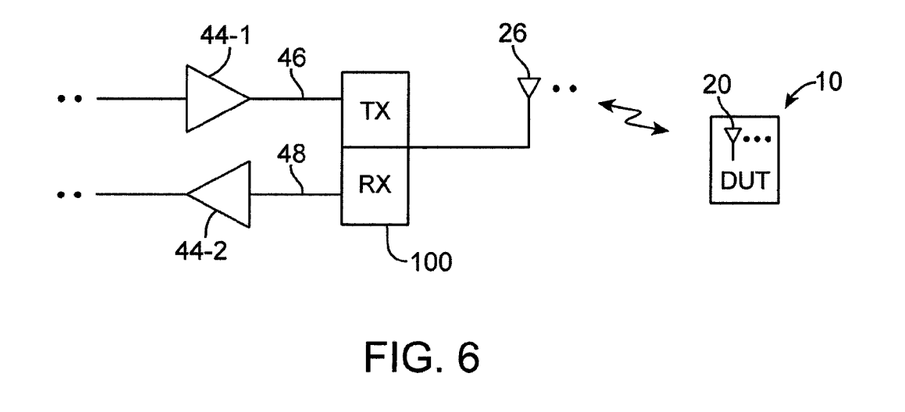
FIG. 6 is a diagram of illustrative test equipment with a duplexer in accordance with an embodiment of the present invention.

In another suitable arrangement, antenna 26 may be coupled to amplifier circuits 44-1 and 44-2 through a duplexer such as duplexer 100. As shown in FIG. 6, antennas 26 may be shared between downlink circuitry 32 and uplink circuitry 34. Duplexer 100 allows antennas 26 to transmit and receive radio-frequency signals to and from antennas 20 of DUT 10.

Duplexer 100 may provide time-division duplexing (TDD), frequency-division duplexing (FDD), or other types of duplexing. Time-division duplexing transmits and receives radio-frequency signals at different time slots by time-division multiplexing the transmit and receive RF signals, whereas frequency-division duplexing operate the transmitter and receiver at different carrier frequencies. Any suitable type of duplexing circuit may be used.

Figure 7:
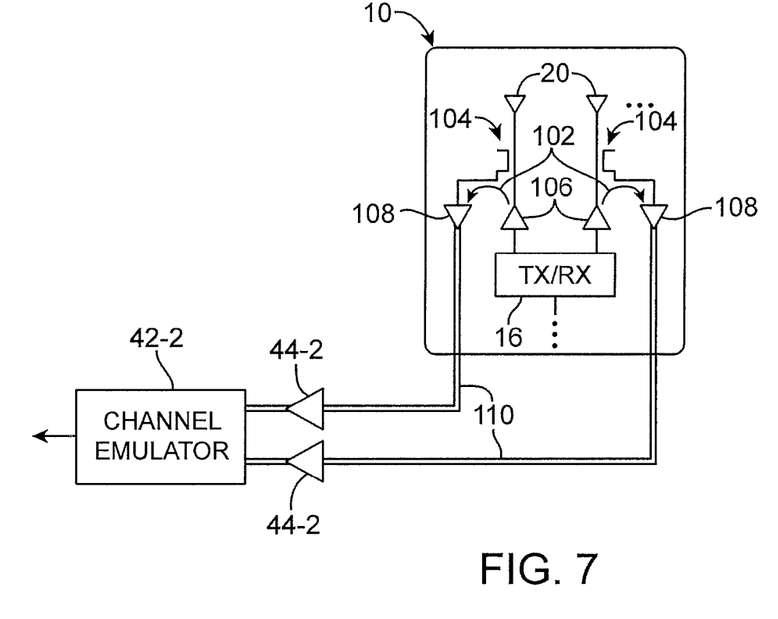
FIG. 7 is a diagram of an illustrative test setup using fiber optic cabling for uplink testing in accordance with an embodiment of the present invention.

Over-the-air testing may be bypassed by conveying radio-frequency signals between the channel emulators and transceiver circuitry 16 through fiber optic cabling. As shown in FIG. 7, cables such as fiber optic cables 110 may be used to carry radio-frequency signals generated by transceiver 16 to channel emulator 42-2 in a conducted manner.

During uplink testing, transceiver 16 may generate radio-frequency signals at its output. The RF signals may be amplified using power amplifiers 106. DUT 10 may include couplers such as directional couplers 104 that couple the RF signals in the direction of arrows 102 to RF-to-optical connectors 108. The RF-to-optical connectors (sometimes referred to as optical connectors) may be used to convert optical signals into analog signals that can be transmitted over electrical wiring. The RF signals are routed to channel emulator 42-2 through connectors 108 and amplifier circuits 44-2 over fiber optic cables 110 (as an example).

Figure 8:
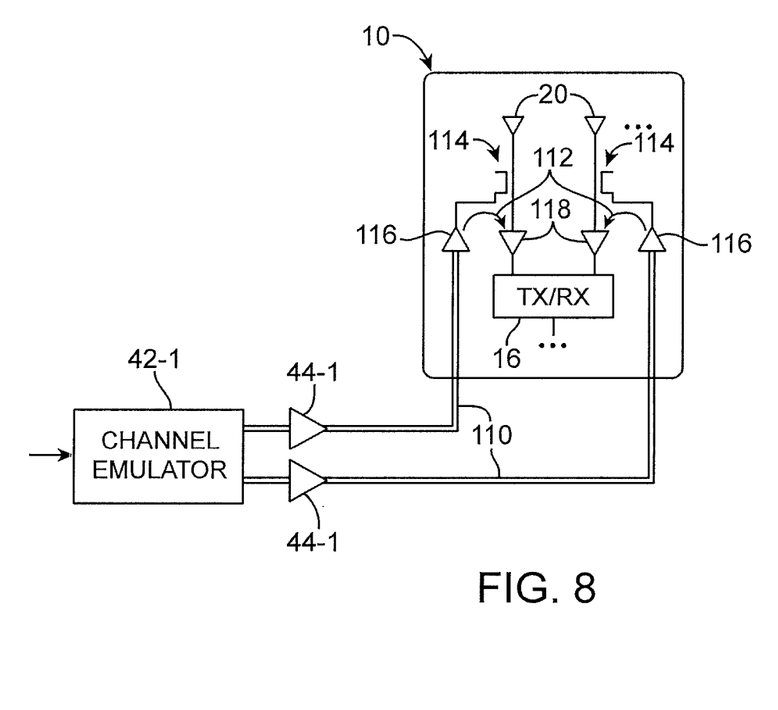
FIG. 8 is a diagram of an illustrative test setup using fiber optic cabling for downlink testing in accordance with an embodiment of the present invention.

FIG. 8 shows a test setup that bypasses wireless transmission during downlink testing. As shown in FIG. 8, channel emulator 44-1 may be coupled to DUT 10 through fiber optic cables 110. RF signals generated by channel emulator 42-1 may be amplified or attenuated by circuits 44-1. The RF signals at the output of circuits 44-1 are fed to optical-to-RF connectors 116. The RF signals may be coupled in the direction of arrows 112 through coupler 114. The RF signals may be amplified by amplifiers such as low noise amplifiers 118. The amplified signals at the output of amplifiers 118 may be fed to transceiver 16 for further processing. Testing DUT 10 using fiber optic cables may present minimal impact to device radiated performance.

Figure 9:
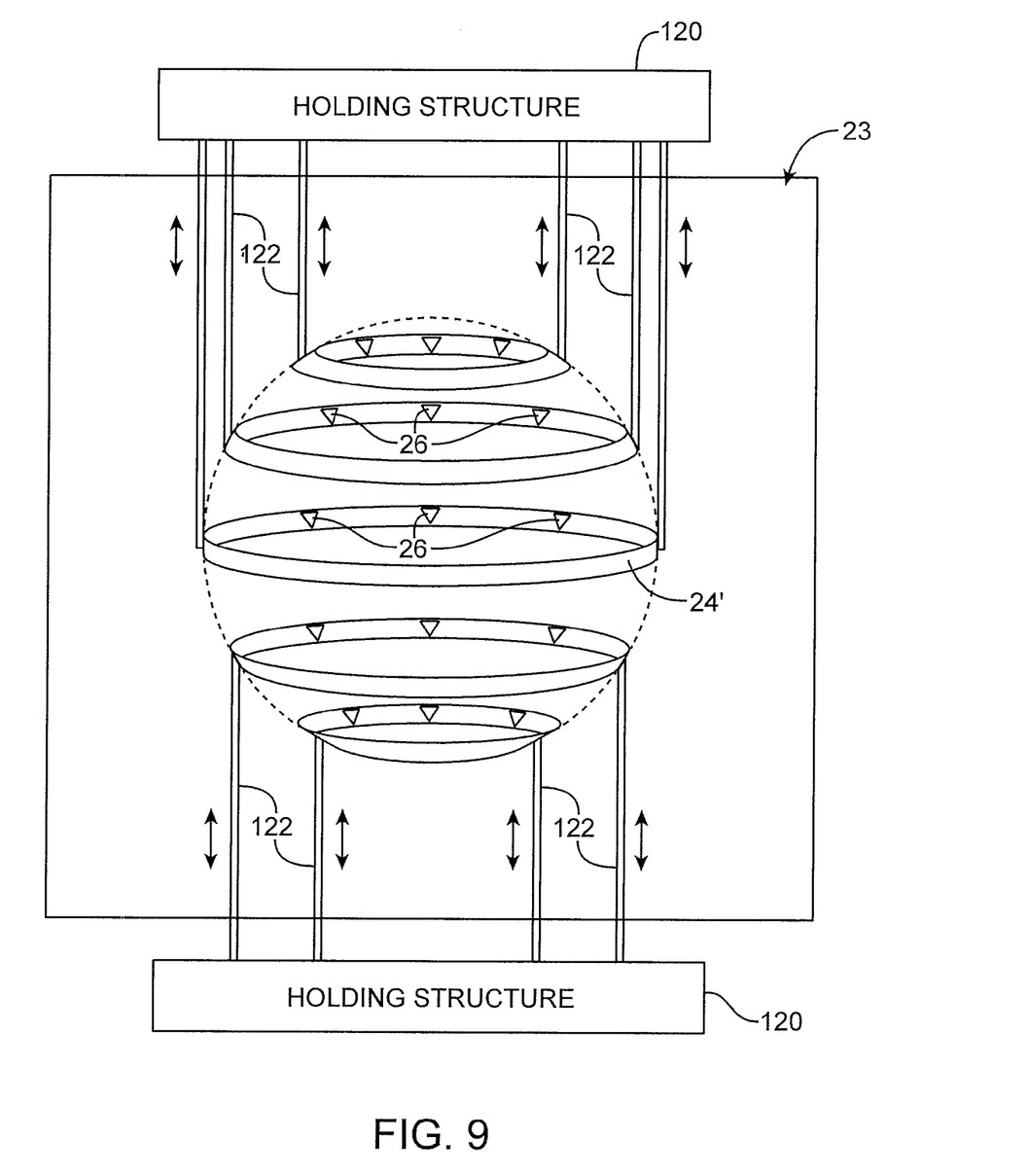
FIG. 9 is a diagram showing an illustrative spherical antenna array structure in a test chamber in accordance with an embodiment of the present invention.

More than one ring-shaped antenna mounting structure may be used in test chamber 23 (e.g., to provide three-dimensional coverage by antennas 26). As shown in FIG. 9, multiple ring-shaped antenna mounting structures of varying sizes may be used to form a spherical antenna mounting structure such as spherical antenna mounting structure 24'. Each of the multiple ring-shaped antenna mounting structures in antenna mounting structure 24' may be lined by absorbers. OTA antennas 26 may be embedded in the absorbers.

Antenna mounting structure 24' may be used to perform three-dimensional tests. Antenna structure 50 may have a diameter of 7 m or more, a diameter that is greater than 1 m, or other suitable size. Antenna mounting structure 24' may generate a feasibility region that has a diameter of 1 m (as an example).

Antenna mounting structure 24' of FIG. 5 may be supported by support structures 120. As shown in FIG. 9, some support structures 122 may extend downwards from an upper holding structure (e.g., holding structure 120) and some support structures may extend upwards from a lower holding structure. If desired, antenna structure 24' may be lowered into place in the test chamber using only an upper holding structure (e.g., the position of each of the multiple ring structures in antenna structure 24' may be adjusted by using motors in the upper holding structure). If desired, antenna structure 50 may be raised into position using only a lower holding structure (e.g., using motors or other positioning equipment). In this type of configuration, each of the multiple ring-shaped antenna mounting structures in antenna structure 24' can be supported by the lower holding structure. Both upper and lower sets of motors or other positioning equipment may be used to adjust the positions of antennas 26 if desired. Arrangements in which antenna positioning equipment is located to the side of antennas 26 may also be used.

Antenna structure 24' may be retracted (e.g., using a nested telescope-type arrangement) when not in use or when it is desired to allow for placement of a DUT at the center of test chamber 23. Lines 46 and 48 may be routed through holding structures 46 to provide each antenna 26 with appropriate connection to circuitry 32 and 34.

The foregoing is merely illustrative of the principles of this invention and various modifications can be made by those skilled in the art without departing from the scope and spirit of the invention.

What is claimed is:

1. A wireless test system with a test chamber in which a device under test is tested, comprising:
   a plurality of antennas in the test chamber;
   downlink circuitry coupled to at least some of the antennas, wherein the downlink circuitry is configured to provide downlink spatial fading and predetermined downlink path loss; and
   uplink circuitry coupled to at least some of the antennas, wherein the uplink circuitry is configured to provide uplink spatial fading and predetermined uplink path loss.

2. The wireless test system defined in claim 1, wherein the uplink circuitry comprises:
   an adjustable amplifier circuit; and
   a channel emulator.

3. The wireless test system defined in claim 2, wherein the downlink circuitry comprises:
   an additional adjustable amplifier circuit; and
   an additional channel emulator.

4. The wireless test system defined in claim 3, wherein the channel emulator comprises a signal estimation circuit that processes radio-frequency signals from the antennas.

5. The wireless test system defined in claim 4, wherein the signal estimation circuit comprises circuitry configured to:
   receive the radio-frequency signals from the antennas;
   analyze the radio-frequency signals received from the antennas using a cost function optimization algorithm; and
   obtain independent signal streams using the cost function optimization algorithm.

6. The wireless test system defined in claim 1, wherein at least one of the antennas is coupled to the downlink circuitry and the uplink circuitry through a directional coupler.

7. The wireless test system defined in claim 1, wherein at least one of the antennas is coupled to the downlink circuitry and the uplink circuitry through a duplexer.

8. The wireless test system defined in claim 1, further comprising:
   at least one base station emulator configured to generate radio-frequency signals that are transmitted to the device under test through the downlink circuitry and configured to receive radio-frequency signals that are transmitted from the device under test through the uplink circuitry.

9. A wireless test system with a test chamber in which a device under test is tested, comprising:
   a plurality of antennas in the test chamber;
   downlink circuitry coupled to at least some of the antennas, wherein the downlink circuitry is configured to provide predetermined downlink path loss; and
   uplink circuitry coupled to at least some of the antennas, wherein the uplink circuitry is configured to provide predetermined uplink path loss, and wherein the uplink circuitry includes an adjustable amplifier circuit and a channel emulator.

10. The wireless test system defined in claim 9, wherein the channel emulator comprises a signal estimation circuit that processes radio-frequency signals from the antennas.

11. The wireless test system defined in claim 10, wherein the signal estimation circuit comprises circuitry configured to:
  receive the radio-frequency signals from the antennas;
  analyze the radio-frequency signals received from the antennas using a cost function optimization algorithm; and
  obtain independent signal streams using the cost function optimization algorithm.

12. The wireless test system defined in claim 9, wherein the downlink circuitry comprises:
  an additional adjustable amplifier circuit; and
  a channel emulator.

13. The wireless test system defined in claim 9, wherein at least one of the antennas is coupled to the downlink circuitry and the uplink circuitry through a directional coupler.

14. The wireless test system defined in claim 9, wherein at least one of antennas is coupled to the downlink circuitry and the uplink circuitry through a duplexer.

15. The wireless test system defined in claim 9, further comprising:
  at least one base station emulator configured to generate radio-frequency signals that are transmitted to the device under test through the downlink circuitry and configured to receive radio-frequency signals that are transmitted from the device under test through the uplink circuitry.

16. A wireless test system for testing a device under test, comprising:
  a test chamber;
  a ring of test antennas within the test chamber that surrounds the device under test, wherein the test antennas in the ring comprise a first group of antennas operable to transmit radio-frequency signals and a second group of antennas operable to receive radio-frequency signals;
  uplink circuitry, wherein the uplink circuitry provides uplink spatial fading and predetermined uplink path loss; and
  downlink circuitry, wherein the downlink circuitry provides downlink spatial fading the predetermined downlink path loss.

17. The wireless test system defined in claim 16, wherein the test chamber comprises an anechoic test chamber.

18. The wireless test system defined in claim 16, wherein the test chamber comprises a reverberation test chamber.

19. The wireless test system defined in claim 16, further comprising:
  at least one base station emulator, wherein during downlink testing, the base station emulator transmits radio-frequency signals to the device under test through the downlink circuitry and wherein during uplink testing, the base station emulator receives radio-frequency signals transmitted from the device under test through the uplink circuitry.

20. The wireless test system defined in claim 16, wherein the uplink circuitry comprises a signal estimation circuit that processes radio-frequency signals from the ring of test antennas.

21. The wireless test system defined in claim 20, wherein the signal estimation circuit comprises circuitry configured to:
  receive the radio-frequency signals from the ring of test antennas;
  analyze the radio-frequency signals received from the ring of test antennas using a cost function optimization algorithm; and
  obtain independent signal streams using the cost function optimization algorithm.

22. A wireless test system for testing a device under test, comprising:
  a test chamber; and
  a ring of test antennas within the test chamber that surrounds the device under test, wherein the test antennas in the ring comprise a first group of antennas operable to transmit radio-frequency signals and a second group of antennas operable to receive radio-frequency signals, wherein the ring of test antennas comprises one of a plurality of rings of test antennas in a three-dimensional array of test antennas within the test chamber.

* * * * *